US006726267B2

(12) United States Patent
Kim et al.

(10) Patent No.: US 6,726,267 B2
(45) Date of Patent: Apr. 27, 2004

(54) CONSOLE ASSEMBLY (75) Inventors: Kwang-Ha Kim, Holland, MI (US); David J. Spykerman, Zeeland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/258,505

(22) PCT Filed: Apr. 25, 2001

(86) PCT No.: PCT/US01/40605

§ 371 (c)(1),
(2), (4) Date: Apr. 14, 2003

(87) PCT Pub. No.: WO01/81118

PCT Pub. Date: Nov. 1, 2001

(65) Prior Publication Data

US 2003/0155786 A1 Aug. 21, 2003

Related U.S. Application Data (60) Provisional application No. 60/199,440, filed on Apr. 25, 2000.

(51) Int. Cl.⁷ ................................................. B60R 7/04
(52) U.S. Cl. ...................................... 296/24.1; 296/37.8
(58) Field of Search ............................ 296/24.1, 37.1, 296/37.8, 37.14; 224/278, 279, 926

(56) References Cited

U.S. PATENT DOCUMENTS

| 4,809,897 A | * | 3/1989 | Wright, Jr. .................. 224/282 |
| 4,998,770 A | * | 3/1991 | Shimizu et al. ............. 296/37.8 |
| 5,863,089 A | * | 1/1999 | Ignarra et al. .............. 296/37.8 |
| 6,135,529 A | * | 10/2000 | De Angelis et al. ........ 296/37.8 |
| 6,367,857 B2 | * | 4/2002 | Kifer et al. .................. 296/24.1 |
| 6,644,526 B2 | * | 11/2003 | Pegorier ...................... 224/539 |
| 2001/0030436 A1 | * | 10/2001 | Kifer et al. .................. 296/24.1 |
| 2003/0107228 A1 | * | 6/2003 | Ono et al. ................... 296/24.1 |

FOREIGN PATENT DOCUMENTS

| DE | 19529876 A | * | 2/1997 |
| DE | 19856979 A | * | 3/2000 |
| EP | 0189051 A | * | 7/1986 |

OTHER PUBLICATIONS

Patent Abstracts of Japan vol. 006, No. 267 (M–182), Dec. 25, 1982 & JP 57 158140 A (Nissan JidoshaKK), Sep. 29, 1982 abstract.*

* cited by examiner

Primary Examiner—D. Glenn Dayoan
Assistant Examiner—Patricia L. Engle
(74) Attorney, Agent, or Firm—Foley & Lardner LLP (57) ABSTRACT A console assembly includes: a storage module (16) having an interior compartment for holding items, an upper module (12) for storing items and a lower module (14) having a recess for holding items. The lower module (14) is connected to the storage module (16) in a track and translates across the opening into the interior compartment of the storage module (16) to selectively allow access to a portion thereof. The upper module (12) includes a storage area having a beverage holder and an ashtray. The upper module (12) is also connected to the storage module (16) in a track and translates independently and over the lower module (14) such that the upper module (12) can be located above the lower module (14) to provide an access to the interior compartment of the storage module (16) or the upper module (12) can be located away from the lower module (14) such that the upper module (12) and lower module (14) close the access to the interior compartment of the storage module (16). A latch module disposed in the upper module (12) holds the upper module (12) in position with respect to the storage module (16).

15 Claims, 9 Drawing Sheets

CONSOLE ASSEMBLY

BACKGROUND OF THE INVENTION

1. Field of the Invention

The present invention relates to a console for storing or containing various items in a vehicle. More particular, the present invention relates to a reconfigurable, modular storage console having an easily operable latch mechanism.

2. Description of the Prior Art

Various types of storage containers are well known for use in a vehicle including as a center console. Vehicle storage containers and organizers continue to be very popular in all types of vehicles. One reason for the increase in popularity is that storage containers afford a vehicle driver or passenger increased organization and utilization of interior space. Additionally, a storage console can add to driver and passenger convenience and comfort since they can hold beverage cups, cans and bottles as well as numerous other types of objects, equipment, tools, gear and items. However, despite being aware of the above, vehicle designers and manufacturers continue to provide very simple and basic storage compartments.

It is common for a vehicle to have a single storage compartment, typically located in a center console positioned on the floor, and having a single door for accessing the interior of the storage container. These types of console systems are relatively inaccessible or unusable, thereby undesirably preventing access to the items stored in the containers by a driver or passenger within the passenger compartment. Thus, a driver or passenger seeking a particular item must use one entry into a single compartment storage container where items are stored one on top of another with little organization. Further, if any item is set on top of the entry door, it must be moved before entry may be made into the storage container's interior.

The above attributes of existing storage containers increase the likelihood of not easily finding a particular item as well as the likelihood of items in the container shifting during travel, which can lead to damage. While some solutions have provided for the inclusion of a separately located cup-holder feature or pocket or even multiple compartment consoles, these additions add to the size of the footprint of the storage container.

FEATURES AND SUMMARY OF THE INVENTION

It is an object of the present invention to improve a console assembly for a vehicle and to provide a console assembly that includes convenient and accessible storage compartments as well as a place to hold a beverage container and a useable work surface which all can be reconfigured to obtain advantageous results. The present invention provides a console assembly with a lower storage module and a tray mounted within a track in the lower storage module and movable thereon.

The present invention further provides a console assembly with an upper storage module mounted within a separate track in the lower storage module and movable with respect to the lower module and the tray which includes a latch member mounted on the upper module for selectively moving the upper module with respect to the lower module and the tray.

Additionally, the present invention provides a console assembly having the above advantages, and is capable of having an attractive, integrated appearance within the vehicle interior.

The console assembly accordingly to the present invention includes a lower module for storing items, a tray mounted within a track in the lower module and movable thereon, an upper module mounted within a second track and movable with respect to the lower module and the tray, and a latch member mounted on the upper module for selectively moving the upper module with respect to the lower module and the tray.

The console assembly of the present invention has the advantage of providing multiple storage containers within a confined footprint while allowing easy access and reconfiguration of the storage compartments and the tray. The tray and upper module are selectively positionable to provide access to the storage interior of the lower module. Further, the upper module is provided with storage area as well as beverage container holder and a separate cover for the upper module. The cover for the upper module is also usable as a work surface when the upper module is located proximal the rear of the console. This provide closer and more convenient access to the items to a driver or passenger of the vehicle as well as occupants of the rear of the vehicle. The console assembly can be produced using known materials and processes.

The following description of the preferred embodiment is merely exemplary in nature, and is in no way intended to limit the invention, any application of the invention or its uses. Accordingly, alternatives to the features of the invention will be apparent to those skilled in the art after reviewing the present application, such alternatives falling within the scope of the present invention if they fall within the scope of the claims which follow.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENTS

Figure 1:
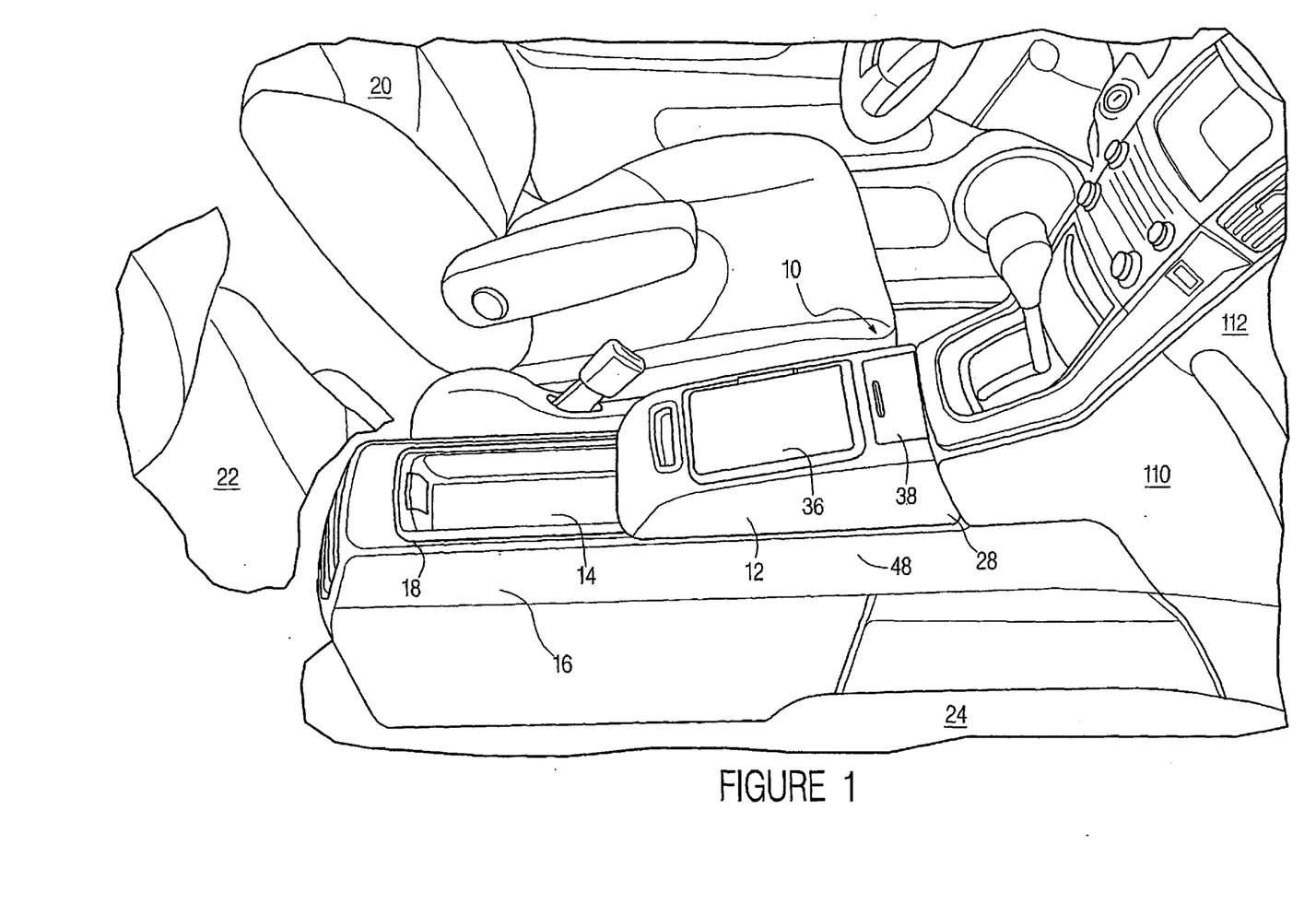
FIG. 1 is a perspective view of the console assembly according to a preferred embodiment of the present invention in a first configuration.
Figure 2:
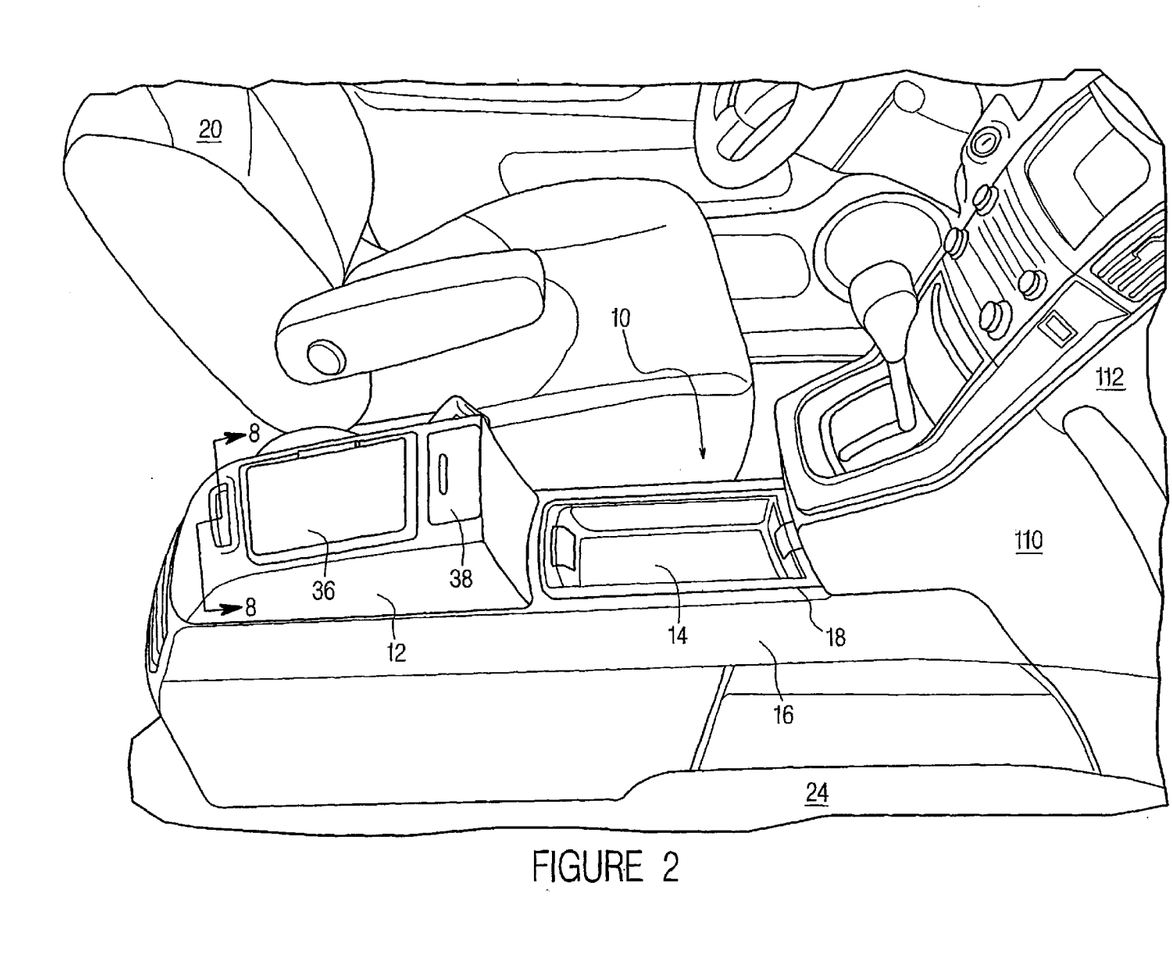
FIG. 2 is a perspective view of the console assembly according to a preferred embodiment of the present invention in a second configuration.
Figure 11:
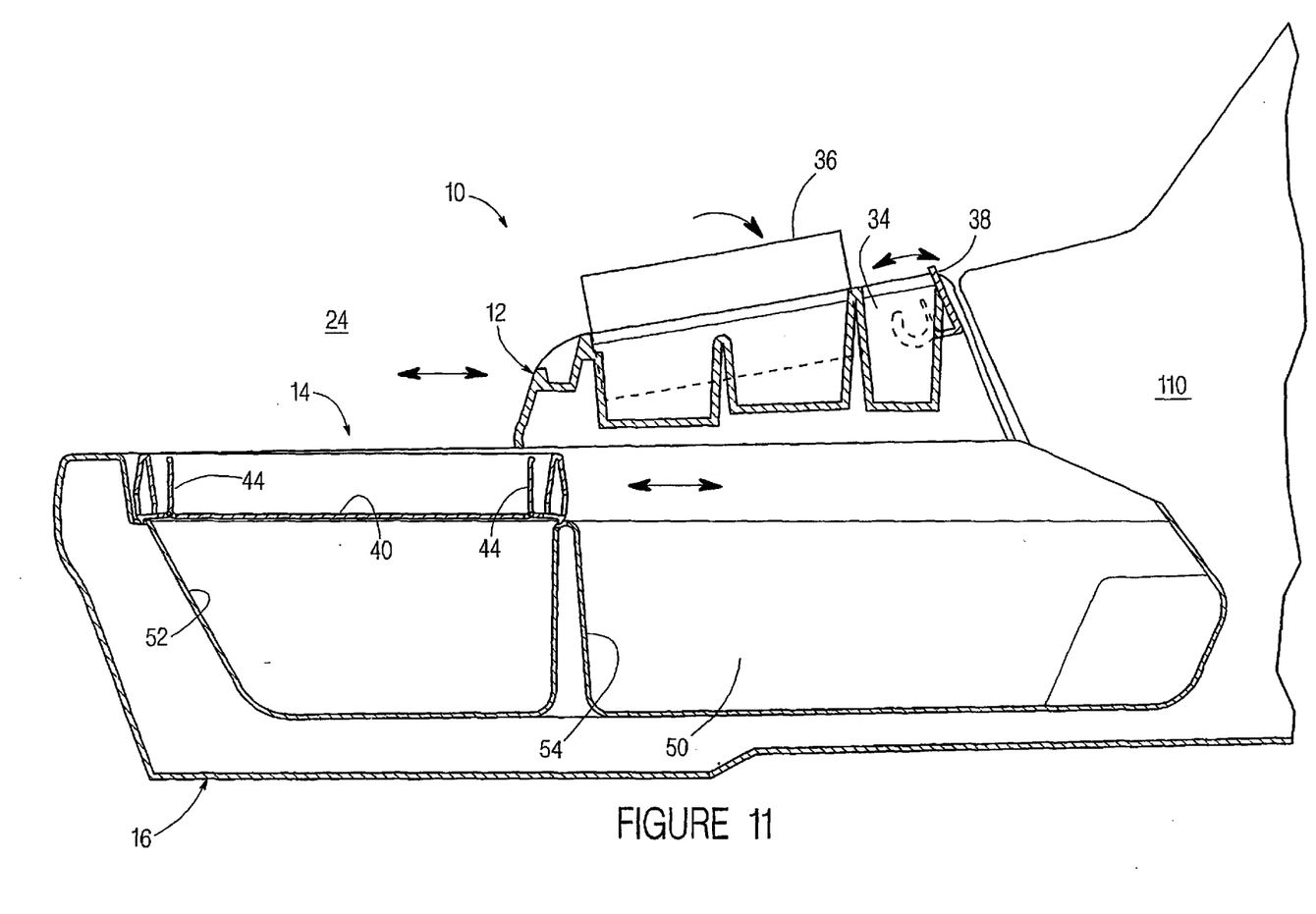
FIG. 11 is a partial, sectional side view of the console assembly of a preferred embodiment of the present invention.

As generally shown in the FIGS. 1 through 11 and as best shown in FIGS. 1, 2 and 11, the console assembly 10 of the preferred embodiment of the invention includes an upper module 12, a lower module 14, a storage module 16, and a guide track 18. Although the console assembly 10 of the invention is preferably located between a driver-side seat 20 and a passenger-side seat 22 of a vehicle interior 24, the console assembly 10 may alternatively be located in other suitable locations within the vehicle interior 24.

Figure 3:
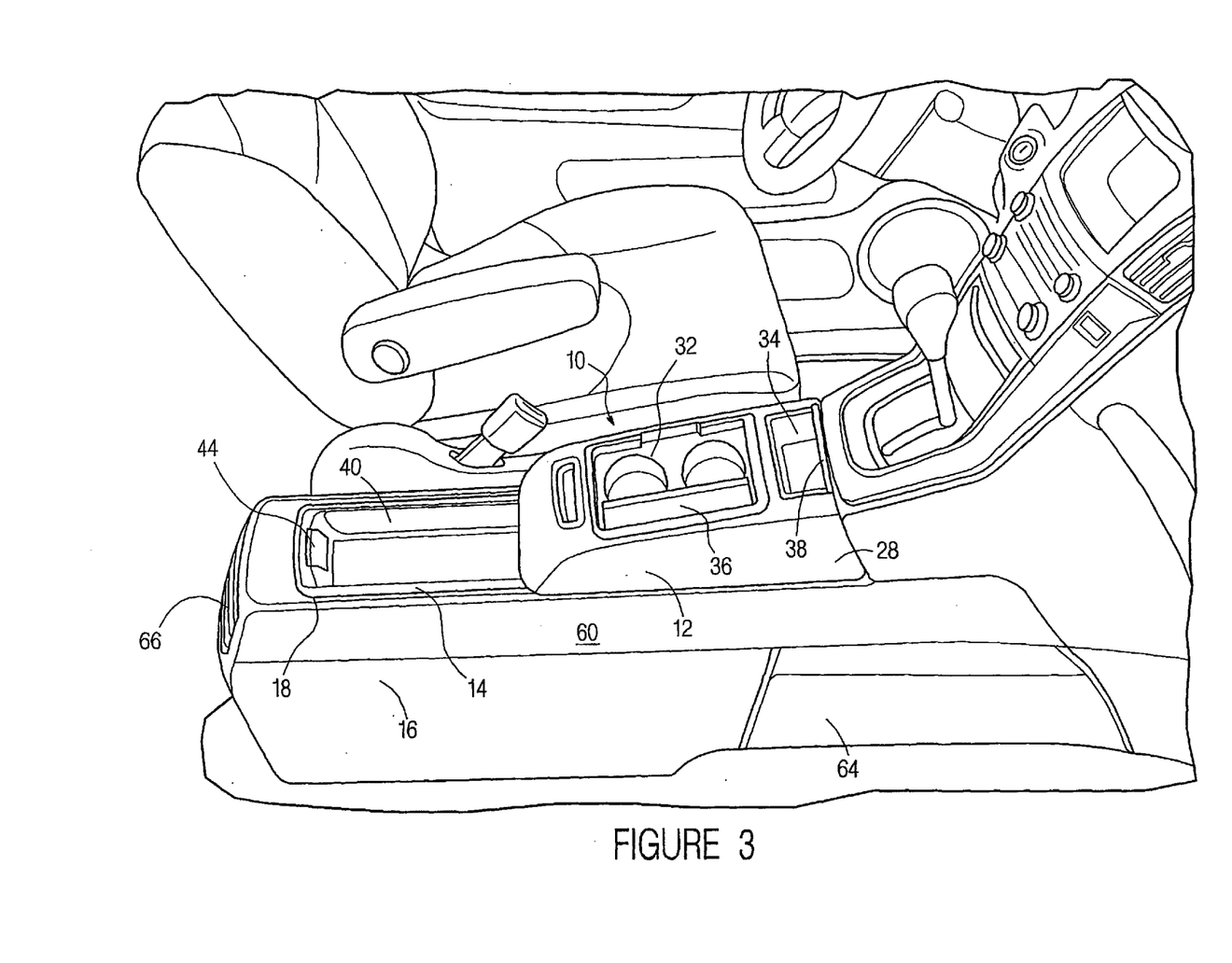
FIG. 3 is a perspective view of the console assembly according to a preferred embodiment of the present invention in a third configuration.
Figure 4:
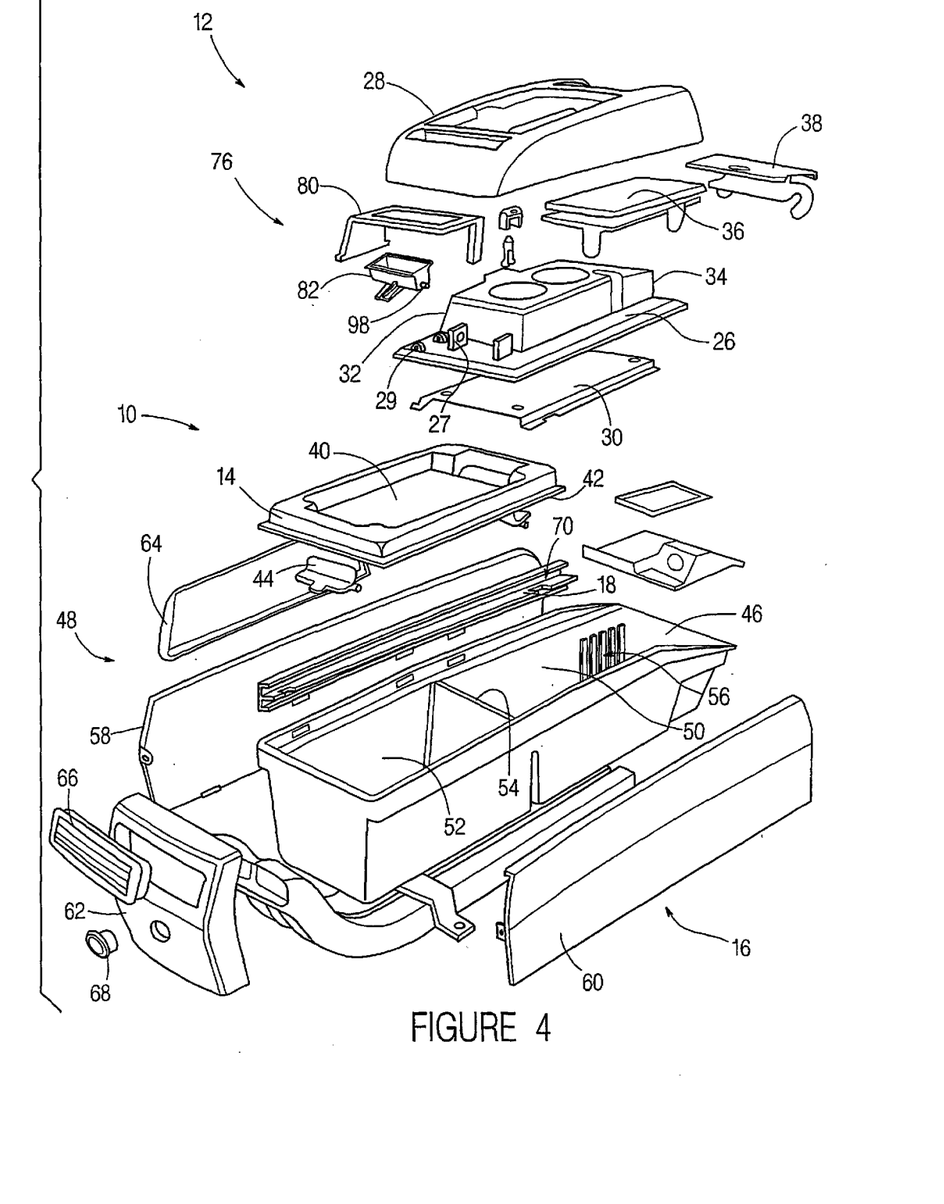
FIG. 4 is an exploded view of the console assembly of a preferred embodiment of the invention.

As shown in FIGS. 3 and 4, the upper module 12, which functions to provide an armrest surface and to contain particular objects, preferably includes a substrate member 26, an exterior member 28, and a slide member 30. The substrate member 26, which functions as a base for the upper module 12, preferably includes a cupholder 32 and an ashtray 34. The substrate member 26 may alternatively include other cargo compartments, such as a coin slot or a cell phone slot. The substrate member 26 is preferably made from a stiff material, such as a plastic material and from conventional methods, but may alternatively be made with other suitable materials and from other suitable methods.

The exterior member 28 of the upper module 12, which functions to cover and decorate the substrate member 26, is preferably fastened to the substrate member 26 with multiple screws, but may alternatively be fastened with other suitable devices, such as adhesives or snap-together parts. In the preferred embodiment, the exterior member 28 includes a cupholder lid 36 and an ashtray lid 38 and functions as a writing surface when the cupholder lid 36 is in the closed position. The cupholder lid 36 and the ashtry lid 38 are preferably moveable from a closed position (shown in FIGS. 1 and 2) and an open position (shown in FIG. 3). In the closed position, the cupholder lid 36 and ashtray lid 38 effectively covers the cupholder 32 and the ashtray 34, while in the open position, the cupholder lid 36 and ashtray lid 38 allow access through the exterior member 28 to the cupholder 32 and the ashtray 34. In an, alternative embodiment, the exterior member 28 may include other devices, such as a coin slot lid or a cell phone slot lid. The exterior member 28 is preferably made from a material pleasing to the eye and the hand, such as a fabric or leather material, and with conventional methods, but may alternatively be made from other suitable material and with other suitable methods. Further, the exterior member 28 may be integrally formed with the substrate member 26.

The slide member 30 of the upper module 12 functions to allow sliding of the upper module 12 on the guide track 18 relative to the storage module 16. The slide member 30 is preferably fastened to the substrate member 26 with multiple screws, but may alternatively be fastened with other suitable devices, such as adhesive or snap-together parts. Further, the slide member 30 may be integrally formed with the upper module 12. In the preferred embodiment, the slide member 30 extends outwardly from the substrate member 26 to engage the guide track 18. In an alternative embodiment, the slide member 30 may extend inwardly towards the substrate member 26 to engage a differently configured guide track. The slide member 30 is preferably made from a material with an appropriate surface friction, such as a plastic material, and with conventional methods, but may alternatively be made from other suitable materials and with other suitable methods.

The lower module 14, which functions to cradle thin objects such as loose change, sunglasses and portable phones or other similar items, preferably includes a recessed portion 40, a slide portion 42, and a simple latch 44. The recessed portion 40 functions to prevent these particular objects from rolling out of or falling from the lower module 14 during operation of the vehicle. The slide portion 42, like the slide member 30 of the upper module 12, functions to allow sliding of the lower module 14 on the guide track 18 relative to the storage module 16. The slide portion 42 is preferably made from a material with an appropriate surface friction, such as a plastic material, and with conventional methods, but may alternatively be made from other suitable materials and with other suitable methods. The simple latch 44 functions to engage a portion of the storage module 16 and hold the lower module 14 in the rearward position. The simple latch 44 is preferably made from conventional materials and with conventional methods but may alternatively be made from other suitable materials and with other suitable methods.

The storage module 16, which functions to hold larger objects, preferably includes an interior compartment 46 and an exterior panel 48. The interior compartment 46 preferably includes a front section 50 and a rear section 52. In the preferred embodiment, the interior compartment 46 includes a storage partition 54 between the front section 50 and the rear section 52 to divide the interior compartment 46 into distinct sections. In an alternative embodiment, the interior compartment 46 may include multiple storage partitions, or may not include any storage partitions. The interior compartment 46 preferably includes multiple slots 56 for compact discs or cassettes, but may alternatively include other suitable devices. The interior compartment 46 is preferably made from a stiff material, such as a plastic material, and with conventional methods, but may alternatively be made from other suitable materials and with other suitable methods.

The exterior panel 48 of the storage module 16, which functions to cover and decorate the interior compartment 46, is preferably fastened to the interior compartment 46 with multiple screws, but may alternatively be fastened with other suitable devices, such as adhesives or snap-together parts. The exterior panel 48 preferably includes a left section 58 facing the driver-side seat, a right-section 60 facing the passenger-side seat, and an end extension 62 facing in a rear direction. Preferably, the left section 58 and the right section 60 include map pockets 64 and the end section 62 includes a vent 66 and an electrical outlet 68. Alternatively, the exterior panel 48 may include other suitable devices. The exterior panel 48 is preferably made from a material pleasing to the eye and the hand, such as a fabric or leather material, and with conventional methods, but may alternatively be made from other suitable materials and with other suitable methods.

The guide track 18 functions to allow independent sliding of the upper module 12 and the lower module 14 relative to the storage module 16. The guide track 18 preferably includes a left track 70 and a right track 71 shown in FIG. 8. Both the left track 70 and the right track are preferably fastened to the storage module 16 with multiple screws, but may alternatively be fastened with other suitable devices, such as adhesives or snap-together parts. Both the left track 70 and the right track preferably include an upper rail 72 and a lower rail 74. The upper rail 72 preferably engages the slide member 30 of the upper module 12, while the lower rail 74 preferably engages the slide portion 42 of the lower module 14. In this manner, the upper module 12 is slidable between a forward position (shown in FIG. 1) and a rearward position (shown in FIG. 2), while the lower module 14 is slidable between a rearward position (shown in FIG. 1) and a forward position (shown in FIG. 2). Because the upper module 12 extends substantially upward from the slide member 30 and because of the distance between the upper rail 72 and the lower rail 74, the upper module 12 and the lower module 14 are slidable relative to each other. The guide track 18 is preferably made from a stiff material, such as a plastic material, and with conventional methods, but may alternatively be made from other suitable materials and with other suitable methods.

Figure 5:
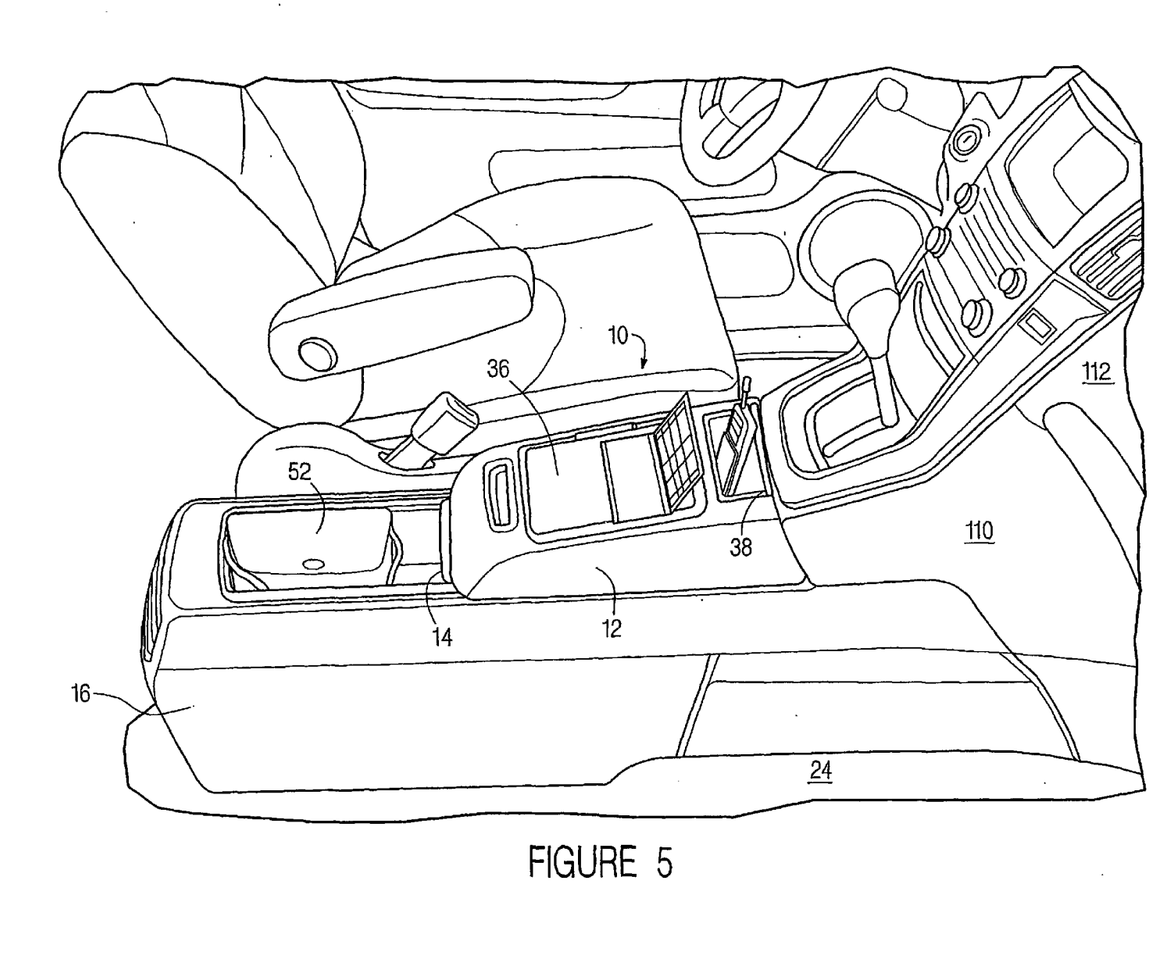
FIGS. 5 and 6 are perspective views of the console assembly of a preferred embodiment of the invention.
Figure 6:
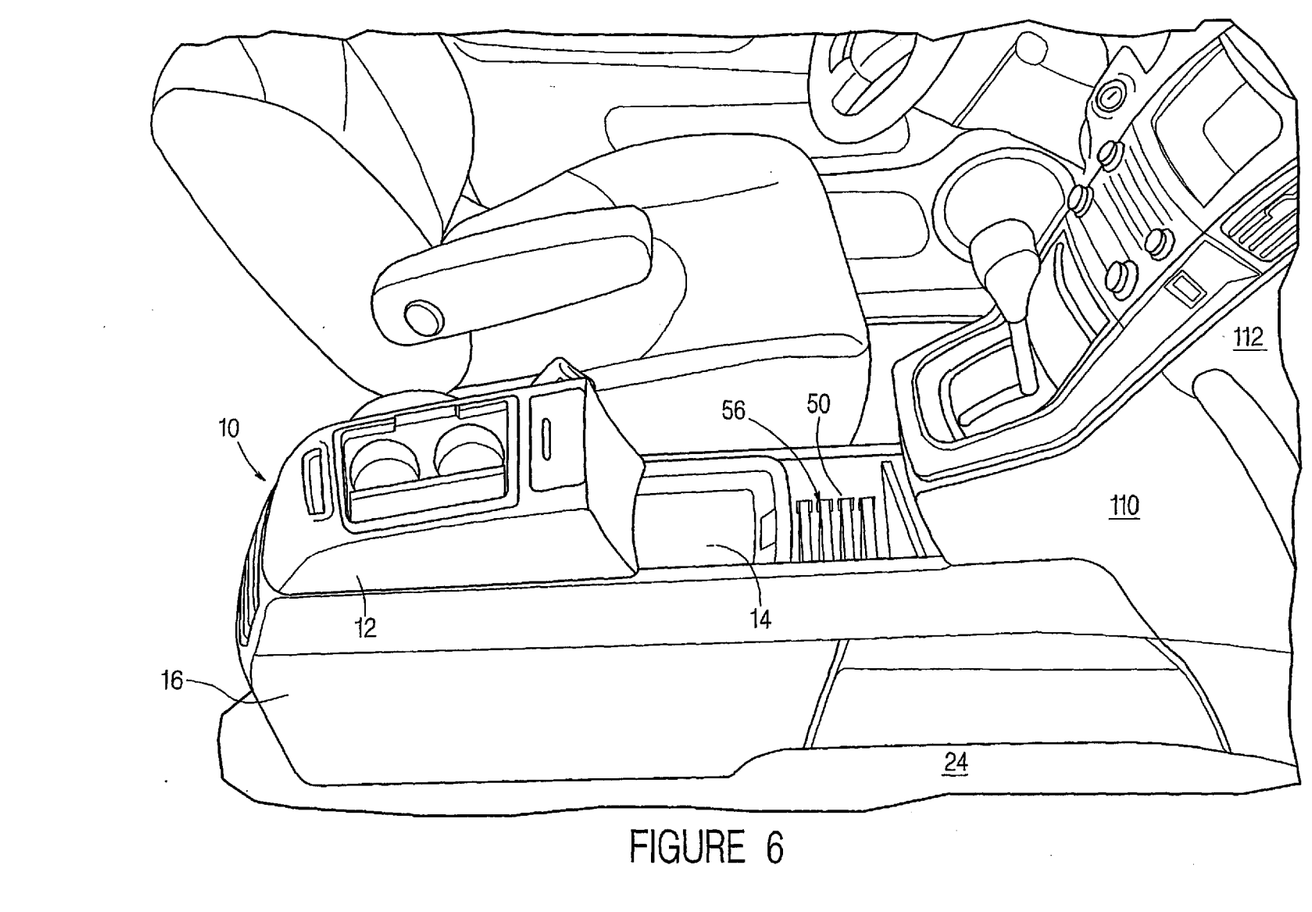
Figure 7:
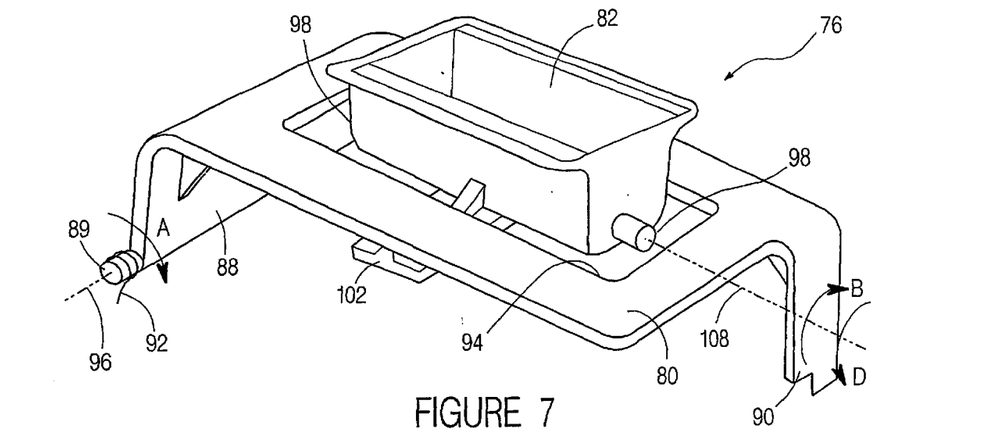
FIG. 7 is a perspective view of the latch module of a preferred embodiment of the invention.
Figure 8:
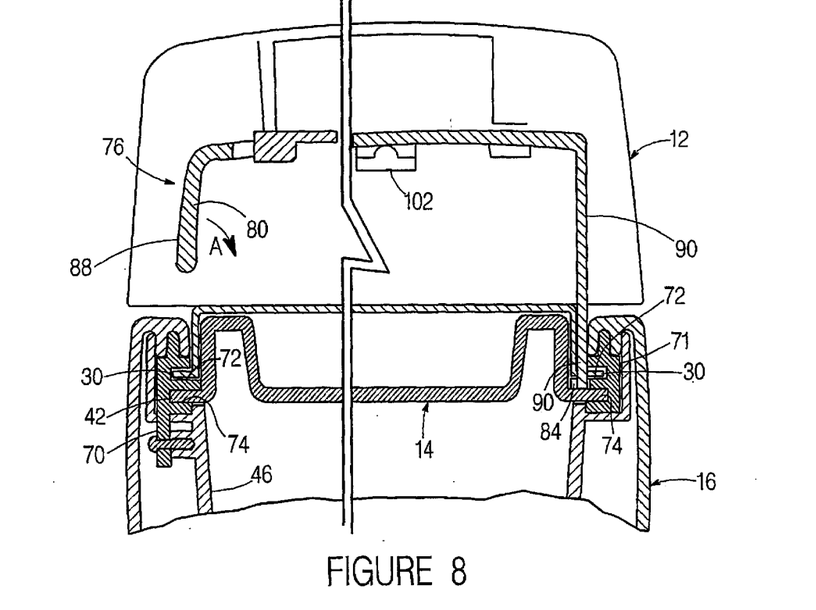
FIG. 8 is a partial cross-sectional view of the console assembly of a preferred embodiment of the invention.
Figures 9, 10:
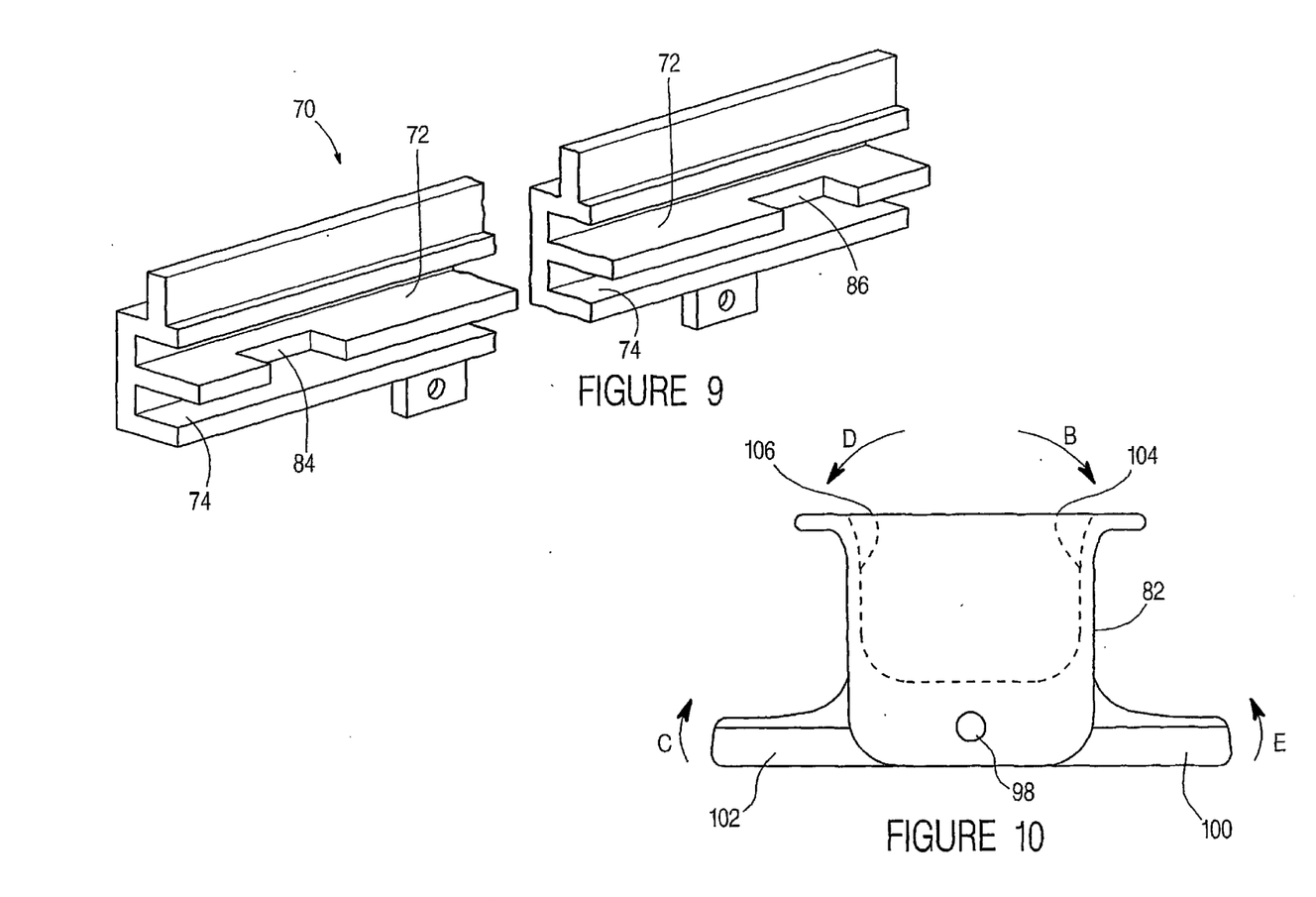
FIG. 9 is a perspective view of the track of a preferred embodiment of the invention.
FIG. 10 is a side view of the release member of the latch module of a preferred embodiment of the invention.

With the upper module 12 in the forward position and the lower module 14 in the rearward position (shown in FIG. 1) or with the upper module 12 in the rearward position and the lower module 14 in the forward position (shown in FIG. 2), the rear section 52 and the front section 50 of the storage module 16 are concealed. To access the rear section 52 of the storage module 16, both the upper module 12 and the lower module (hidden under the upper module) are moved to the forward position, as shown in FIG. 5. Likewise, to access the front section 50 of the storage module 16, both the upper module 12 and the lower module 14 are moved to the rearward position, as substantially shown in FIG. 6.

As shown in FIGS. 4 and 7 through 10, the console assembly 10 of the preferred embodiment of the invention also includes a latch module 76. The latch module 76 functions to selectively hold the upper module 12 in a particular position along the guide track 18. The latch module 76 preferably includes a latch member 80, and a release member 82. Alternatively, the left track 70 may be integrally formed with the right track. The guide track 18 is preferably made from a strong material, such as a metallic material, and with conventional methods, but may alternatively be made from other suitable materials and with other suitable methods.

The guide track 18 preferably includes a rearward notch 84 and a forward notch 86, but may alternatively include one or more notches in other suitable locations. The particular location of the rearward notch 84 and the forward notch 86 allow the upper module 12 to be selectively held in the rearward position and the forward position. The latch member 80 of the latch module 76 functions to engage the rearward notch 84 and the forward notch 86 of the guide track 18. The latch member 80 preferably includes a mounting arm 88, an engaging arm 90, a biasing spring 92, and a large opening 94. The mounting arm 88 is preferably mounted to the substrate member 26 of the upper module 12 for rotational movement about a peg 89 defining a first pivot axis 96. The engaging arm 90 preferably extends downward through the upper module 12 towards the guide track 18. The latch member 80 is rotated about the first pivot axis 96 in direction A, when the pegs 89 are located in the sockets 27.

In a preferred embodiment, the biasing spring 92 of the latch module 76 is a torsional spring and is located on the peg 89 adjacent the mounting arm 88 to bias the latch member 80 in direction A. In an alternative embodiment, the biasing spring 92 may be a leaf spring or any other suitable device located adjacent the engaging arm 90 or any other suitable portion of the latch member 80. The latch member 80 is preferably made from a strong material, such as a plastic material, and with conventional methods, but may alternatively be made from other suitable materials and with other suitable methods.

The release member 82 of the latch module 76, which functions to disengage the engaging arm 90 of the latch member 80 from the guide track 18, preferably includes mounting pegs 98, a first lever 100, a second lever 102, a forward contact 104, and a rearward contact 106. The mounting pegs 98 are preferably mounted to the stand-offs 29 of the substrate, member 26 of the upper module 12 for rotational movement about a second pivot axis 108. The first lever 100 and the second lever 102 preferably extend outward from the release member 82, one in a forward direction and one in a rearward direction. When the release member 82 and the latch member 80 are mounted to the substrate member 26, the release member 82 preferably extends through the large opening 94 of the latch member 80 and the first lever 100 and the second lever 102 preferably extend under the latch member 80. With this arrangement, if the release member 82 is rotated forward about the second pivot axis 108 in direction B, then the second lever 102 moves direction C and raises the latch member 80 and disengages engaging arm 90 from the rearward notch 84 of the guide track 18. Likewise, if the release member 82 is rotated rearward about the second pivot axis 108 in direction D, then the first lever 100 moves in direction E and raises the latch member 80 and disengages the engaging arm 90 from the notch 86 in guide track 18.

The forward contact 104 and the rearward contact 106 of the release member 82 function to provide ergonomic contact surfaces to rotate the release member 82 forward and rearward about the second pivot axis 108 and to slide the upper module 12 into a particular position along the guide track 18. In this manner, when the upper module 12 is in the rearward position, a vehicle occupant may extend a thumb into the release member 82 and push on the forward contact 104 thereby disengaging the latch member 80 from the guide track 18 and sliding the upper module 12 towards the forward position. Likewise, when the upper module 12 is in the forward position, the vehicle occupant may extend several fingers into the release member 82 and pull on the rearward contact 106 thereby disengaging the latch member 80 from the guide track 18 and sliding the upper module 12 toward the rearward position. This feature allows one-handed operation to disengage the latch module 76 and slide the upper module 12.

In the preferred embodiment of the invention, as shown in FIG. 1, both the exterior panel 48 of the storage module 16 and the exterior member 28 of the upper module 12 coordinate with a center protrusion 110 of an instrument panel 112 of the vehicle interior 24. In this manner, the exterior panel 48 preferably extends to cover a portion of the center protrusion 110 of the instrument panel 112, while the exterior member 28 provides a smooth transition with the center protrusion 110 of the instrument panel 112. In other words, the console assembly 10 preferably mates with the instrument panel 112 of the vehicle and acts as an extension of the center protrusion 110 between the driver-side seat 20 and the passenger-side seat 22. In an alternative embodiment, the console assembly 10 may mate with another suitable component of the vehicle interior 24.

The foregoing discloses and describes preferred embodiments of the present invention. One skilled in the art will readily recognize from such description, and from the accompanying drawings and claims, that changes and modifications can be made to the invention without departing from the true spirit and scope of the invention as defined in the following claims.

What is claimed is:

1. A console assembly for use in a passenger compartment in a vehicle, said console assembly comprising:

an upper module having a first storage area;

a lower module located with respect to said upper module, said lower module having a recess portion;

a storage module located with respect to said upper module and said lower module, said storage module having an interior compartment having a first portion of said interior compartment covered by said upper module and a second portion of said interior compartment covered by said lower module.

2. The console assembly of claim 1, wherein said upper module is located above said lower module and said lower module is located above said interior compartment of said storage module and further wherein said first portion of said interior compartment of said storage module is the same as said second portion of said interior compartment of said storage module.

3. The console assembly of claim 1, wherein said upper module is located above said lower module and said lower module is located above said interior compartment of said storage module and further wherein said first portion of said interior compartment of said storage module does not overlap with said second portion of said interior compartment of said storage module.

4. The console assembly of claim 1, wherein said interior compartment of said storage module comprises a partition defining said first portion and said second portion of said interior compartment and further wherein said upper module can be reconfigured to cover one of said first portion and said second portion and said lower module can separately be reconfigured to cover one of said first portion and said second portion.

5. The console assembly of claim 4, wherein said upper module further comprises a latch module for selectively holding said upper module in a position with respect to said storage module.

6. The console assembly of claim 5, wherein said storage module comprises a first track for receiving said upper module, said upper module translating along said first track and with respect to said storage module and further wherein said latch module comprises a latch member integrated with said upper module and having an opening therein and a release member having a first contact location for releasing said latch member when a force is applied in a direction toward said first contact location and a second contact location spaced from said first contact location for releasing said latch member when a force is applied in a direction toward said second contact location.

7. The console assembly of claim 6 wherein said latch member comprises a first axis and said release member comprises a second axis angularly offset from said first axis of said latch member; wherein said release member is connected to said latch member such that rotation of said release member about said second axis causes said latch member to rotate about said first axis.

8. The console assembly of claim 1 wherein the vehicle includes an instrument panel having a first edge, said upper module of said console assembly comprising a second edge, said first edge of said instrument panel and said second edge of said console assembly being formed complementary.

9. The console assembly of claim 4, wherein said first storage area of said upper module includes one of a beverage container holder, an ashtray, a cell phone holder or a coin slot.

10. The console assembly of claim 4, wherein said storage module further includes a first side facing a direction toward a driver's side of the vehicle and a second side facing a passenger's side of the vehicle, said storage module further comprising a map pocket located on said second side of said storage module.

11. A console assembly, comprising:
a storage module having an interior compartment for storing items, said storage module having a first track and a second track;
an upper module having a first storage area for storing items, said upper module located in said first track in said storage module, said upper module having a latch member for selectively holding said upper member in position on said first track of said storage module; and
a lower module located below said upper module, said lower module having a recess portion for receiving items, said lower member located in said second track in said storage module for movement therein.

12. The console assembly of claim 11, said upper module further comprising a beverage holder located in said first storage area, an ashtray located separate from said first storage area; a first lid for covering said first storage area and a second lid for covering said ashtray.

13. The console assembly of claim 11, wherein said first track of said storage module comprises a first track member having a first dwell and a second dwell spaced from said first dwell; said latch module of said upper module comprises a release member having a first contact and a second contact positioned opposite said first contact, each of said first and second contacts activating said release member to allow said upper module to move along said first track member between said first dwell and said second dwell when a force is applied.

14. The console assembly of claim 13, wherein said latch module comprises a latch member having an arm for engaging one of said first dwell and said second dwell and a first pivot axis offset from said arm; and further wherein said release member has a first lever extending in a first direction, a second lever extending in a second direction and second pivot axis located between said first lever and said second lever, said second pivot axis of said release member offset from said first contact and said second contact of said release member, said release member connected to said latch member such that rotation of said release member about said second pivot axis causes rotation of said latch member about said first pivot axis.

15. The console assembly of claim 14, wherein said latch module further comprises a biasing member for biasing said arm of said latch member about said first pivot axis of said latch member.

* * * * *